[12] United States Patent
Dove

(10) Patent No.: US 9,037,876 B2
(45) Date of Patent: May 19, 2015

(54) INCREASING LEAKAGE CURRENT OF POWER SOURCE UNIT TO ADJUST INPUT RESISTANCE AT NETWORK PORT FOR MITIGATING FALSE DETECTION AS POWERED DEVICE

(75) Inventor: Daniel Joseph Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 633 days.

(21) Appl. No.: 13/260,175

(22) PCT Filed: Jan. 31, 2010

(86) PCT No.: PCT/US2010/022683
§ 371 (c)(1),
(2), (4) Date: Sep. 23, 2011

(87) PCT Pub. No.: WO2011/093897
PCT Pub. Date: Aug. 4, 2011

(65) Prior Publication Data
US 2012/0011380 A1  Jan. 12, 2012

(51) Int. Cl.
*G06F 1/26* (2006.01)
*H04L 12/10* (2006.01)

(52) U.S. Cl.
CPC .................. *G06F 1/26* (2013.01); *G06F 1/266* (2013.01); *H04L 12/10* (2013.01)

(58) Field of Classification Search
None
See application file for complete search history.

(56) References Cited

U.S. PATENT DOCUMENTS

| 5,396,447 | A | 3/1995 | Suntken | |
|---|---|---|---|---|
| 7,356,588 | B2 * | 4/2008 | Stineman et al. | 709/224 |
| 2006/0164775 | A1 | 7/2006 | Stineman et al. | |
| 2007/0133238 | A1 | 6/2007 | Herbold | |
| 2007/0206774 | A1 | 9/2007 | Vorenkamp et al. | |
| 2008/0238656 | A1 | 10/2008 | De La Torre et al. | |
| 2009/0063874 | A1 | 3/2009 | Diab | |
| 2011/0055614 | A1 * | 3/2011 | Lin et al. | 713/340 |

FOREIGN PATENT DOCUMENTS

| CN | CN-101218809 A | 7/2008 |
|---|---|---|
| WO | WO-2006030412 | 3/2006 |

OTHER PUBLICATIONS

PCT; "Notification of Transmittal of the International Search Report and the Written Opinion of the International Searching Authority, or the Declaration"; in PCT/US2010/022683; mailed Sep. 30, 2010; 11 pages.
Ethernet power supply technique and application Jianli Zhu, et. al. 2207, in Chinese.

* cited by examiner

*Primary Examiner* — Kenneth Kim
(74) *Attorney, Agent, or Firm* — HP Patent Development

(57) ABSTRACT

A system for power distribution to network devices in a powered network is described herein. The system includes a first power sourcing equipment (PSE) device, which is configured to communicate data and selectively provide power to one or more devices. The system further includes a second PSE device coupled to the first PSE device through a network cable. The second PSE device is configured to communicate data, selectively provide power to one or more devices, and to receive a probing input through the network cable. The second PSE device includes a false detection mitigation circuit, which is configured to increase a leakage current of the second PSE device. The increased leakage current is associated with a resistive signature that is outside of a resistive range of a valid powered device.

20 Claims, 7 Drawing Sheets

INCREASING LEAKAGE CURRENT OF POWER SOURCE UNIT TO ADJUST INPUT RESISTANCE AT NETWORK PORT FOR MITIGATING FALSE DETECTION AS POWERED DEVICE

I. BACKGROUND

Power over Ethernet (PoE), which is outlined in IEEE standard 802.3™-2005 clause 33 (the PoE standard), refers to a technique for delivering power and data to an electronic device via a network cable, such as a twisted pair Ethernet cable. In a PoE system, power sourcing equipment (PSE) provides power via an Ethernet cable to electronic devices, which may be referred to as powered devices. PoE eliminates the need for a separate power source to deliver power to attached powered devices (PDs). Such powered devices may include Voice over Internet Protocol (VoIP) telephones, wireless routers, security devices, field devices to monitor process control parameters, data processors, and other electronic devices.

The PoE standard specifies a process for detection of a PoE powered device that is coupled to the PSE before supplying power via the Ethernet cable. To perform the detection process, the PSE provides a voltage level that is within a range of 2 volts to 10 volts DC on pairs of wires of the Ethernet cable and monitors a return current (micro-amps) or applies a small current to the wires and monitors a return voltage (V) to detect a resistance signature of the device within an expected range (approximately 25 K-ohms) between the twisted pair wires. If the PSE does not detect a valid resistance, the PSE does not apply power to the Ethernet port assigned to the device.

When two PSE devices are attached together, and one of these PSE devices is unpowered, the actively powered PSE may apply power to the unpowered PSE (uPSE). A PSE applying power to an uPSE may lead to issues when the uPSE is subsequently powered. The uPSE may detect power across the output and conclude that a field effect transistor (FET) has shorted, thus leading to fault detection and error reporting.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

A power sourcing equipment (PSE) device, such as a network switch, may be attached to another PSE device. When a powered PSE device is attached to an unpowered PSE (uPSE) device, the powered PSE device applies a probing input on the uPSE device. Typically, PSE devices include a control field effect transistor (FET) which has a body diode that is reversed to the normal flow of current. The body diode of the uPSE device may allow current to flow through the body diode and into the circuitry of the uPSE. The current through the body diode, which may include leakage current, is detected by the powered PSE device. Depending on the detection voltage, and the leakage currents in the uPSE device, an equivalent resistance is calculated by the powered PSE device. Where the equivalent resistance falls within the expected range for a valid powered device, the powered PSE device may apply power to the unpowered PSE device through the PoE port of the uPSE device, potentially causing fault events and error reporting in the uPSE device when the power is turned on.

A system for power distribution to network devices in a powered network is described herein. The system includes a first power sourcing equipment (PSE) device, which is configured to communicate data and selectively provide power to one or more devices. The system further includes a second PSE device coupled to the first PSE device through a network cable. The second PSE device is configured to communicate data, selectively provide power to one or more devices, and to receive a probing input through the network cable. The second PSE device includes a false detection mitigation circuit, which is configured to increase a leakage current of the second PSE device. The increased leakage current is associated with a resistive signature that is outside of a resistive range of a valid powered device, yet optimized to reduce wasted energy.

Figure 1:
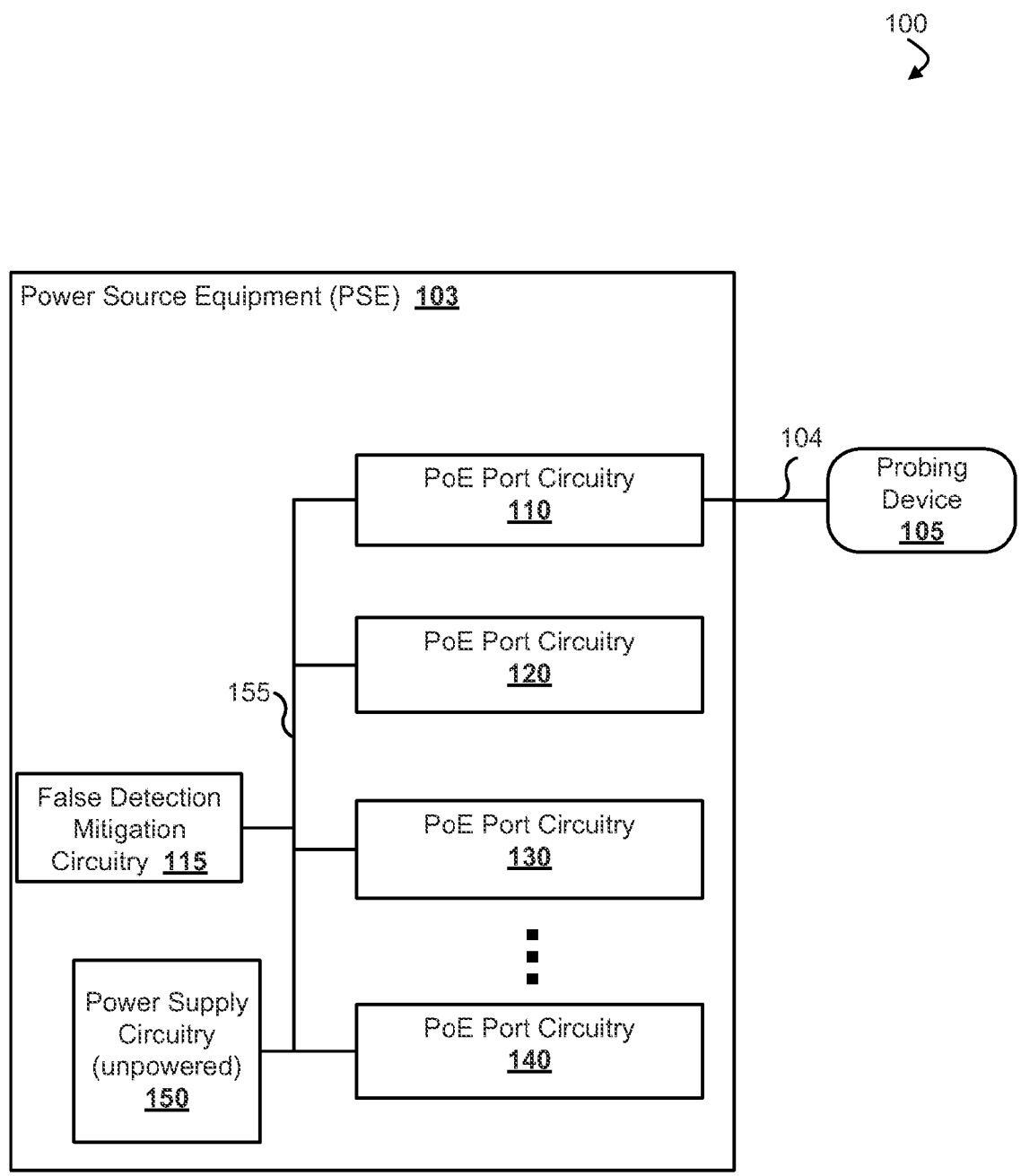
FIG. 1 is topological block diagram of a powered network in accordance with an embodiment of the invention.

FIG. 1 is topological block diagram of a powered network 100 in accordance with an embodiment of the invention. Powered network 100, such as Power over Ethernet (PoE) network, includes power sourcing equipment (PSE) 103 and a probing device 105 operatively coupled by a network cable 104. Network cable 104 may be a twisted pair Ethernet cable or another type of cable adapted to carry power and data. In general, PSE 103 may be coupled to multiple devices via multiple network cables, where each network cable is associated with a particular device.

Probing device 105 is operatively coupled to PSE 103 via network cable 104. Probing device 105 may be a component of a powered PSE and may be configured to perform a powered device detection process by applying a probing input, such as a current or voltage to a particular network cable, such as network cable 104. A powered PSE may be configured to communicate data and selectively provide power to one or more devices. The powered PSE may be coupled to PSE 103 via network cable 104. In one embodiment, the probing input may be a voltage in a range of 2 volts to 10 volts. Further, probing device 105 may be configured to monitor a return current received through network cable 104 to detect the powered device.

The return current is associated with a resistive signature. A resistive signature of a valid powered device can have a resistive range from 19 K-ohms to 26.5 K-ohms, which corresponds with a current range from 80 micro-amp (μA) to 400 μA (for a resistance of approximately 25 K-ohms). A return current for a 2 volt probing input is 2/25K (i.e., voltage/resistance) or 80 μA and the return current for a 10 volt probing input is 10/25K (i.e., voltage/resistance) or 400 μA.

There may be a range of valid currents for any particular applied voltage to account for variations in powered device components.

Where the resistive signature of the return current is detected to fall within a resistive signature range for powered devices, probing device 105 may indicate that power and data be applied to network cable 104. Alternatively, where probing device 105 does not detect the resistive signature to be within the valid range, power may not be applied. Under such circumstances, only data (and not power) may be applied to network cable 104.

PSE 103 is operatively coupled to probing device 105 via network cable 104. The connection between PSE 103 and probing device 105 may include multiple network segments, transmission technologies and components. When powered-on, PSE 103 is configured to communicate data, selectively provide power to one or more powered devices over one or more network cables, and to receive a probing input through network cable 104.

PSE 103 includes power supply circuitry 150 and PoE port circuitry (PoE ports) 110-140. Power supply circuitry 150, shown in an unpowered state, is configured to supply power to PoE ports 110-140 via a power rail 155. PoE ports 110-140 are operatively coupled to each other via the shared power rail 155 and are configured to communicate data, selectively provide power to one or more devices through a plurality of network cables, receive a probing input through a network cable of the plurality of network cables, and provide a return current via a network cable subsequent to receiving a probing input. In one embodiment, PoE ports 110-140 are in an unpowered state.

When the probing device applies the probing input to port 110, current flows into port 110 and across power rail 155. Since power rail 155 is shared among PoE ports 110-140, the probing input also flows to PoE ports 120-140. Unpowered PSE 103 may have leakage current through an unpowered port circuitry and the leakage current normally exceeds the range for a valid powered device. Where the uPSE includes adjacent ports (which are probed for detection by other probing devices) having unpowered circuitry connected by a shared power rail, such as PSE 103, the return current is reduced by 1/N, where N represents the number of unpowered ports connected by the shared power rail that are being probed. For example, if two ports are being probed, each probe sees the current leaking from PoE ports 110-140 to be reduced by half, assuming equal probe voltages. As the probing input flows through PoE ports 110-140, the leakage current from PoE ports 110-140 flows via power rail 155. The collective leakage current from PoE ports 110-140 is included in any probe measurement. As such, the leakage current through PoE port 110 is reduced by 1/N and depending on the strength of the probe input, the reduced return current from PoE port 110 may fall within the range for a valid powered device. If the probe voltages are not equal, the current is not divided by 1/N. Rather, the current is divided in proportion to the probe voltages.

PSE 103 includes false detection mitigation circuitry 115 which is configured to increase the leakage current of the PSE device when detection voltage levels are present. False detection mitigation circuitry 115 is coupled to power rail 155. Notwithstanding a reduction by 1/N of the leakage current caused by a multi-port implementation of PSE 103, mitigation circuitry 115 is configured to generate a return current (e.g., increased leakage current) from PoE port 110 that is outside the range for a valid powered device. Where probing device 105 does not detect the resistive signature of PSE 103 to be within the valid range, power is not applied to PSE 103, thereby avoiding an erroneous detection of a powered device.

The present invention can also be applied in other network topologies and environments. Powered network 100 may be any type of network familiar to those skilled in the art that can support supplying power and data communications using any of a variety of commercially-available protocols, including without limitation USB, TCP/IP, SNA, IPX, AppleTalk, and the like. Merely by way of example, powered network 100 can be a local area network (LAN), such as a PoE network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2A:
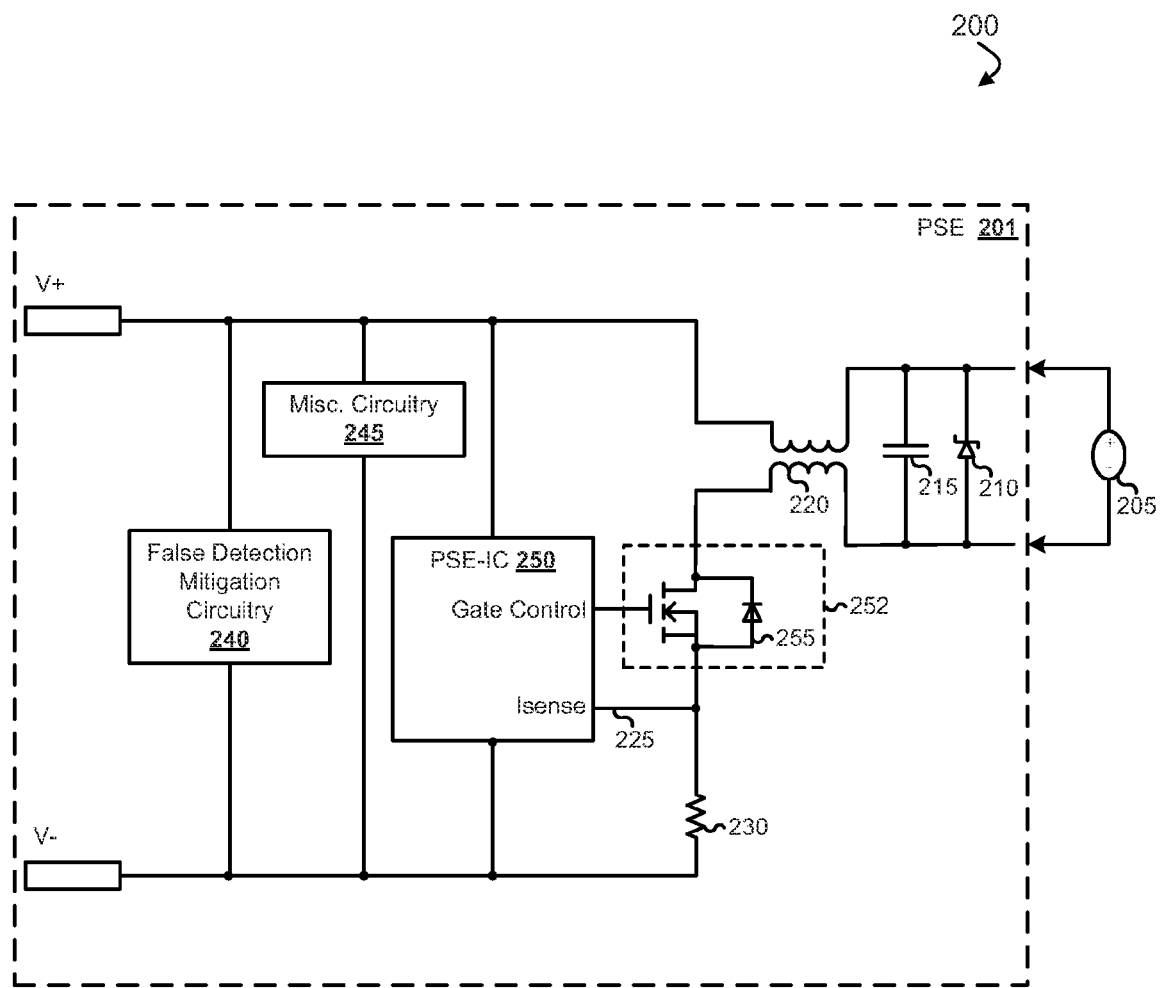
FIG. 2A is a circuit diagram of a power sourcing equipment including false detection mitigation circuitry in accordance with an embodiment of the invention.

FIG. 2A is a circuit diagram 200 of a power sourcing equipment (PSE) 201 including false detection mitigation circuitry in accordance with an embodiment of the invention. PSE 201 includes a power supply circuit (not shown), which includes a pin that connects to a power rail for generating a positive voltage supply (V+) terminal and a negative voltage supply (V−) terminal, PSE 201 further includes a protection diode 210, a capacitor 215, a common mode choke 220, an Isense pin 225, a Field Effect Transistor (FET) 252 with body diode 255, a resistor 230, false detection mitigation circuitry 240, miscellaneous circuitry 245, and a power source equipment controller integrated circuit (PSE-IC) 250. In one embodiment, PSE 201 is in a powered-off state. Circuit diagram 200 also includes a network cable 205 which is configured to apply a probing input to PSE 201. Network cable 205 may be coupled to PSE 201 via a RJ-45 Ethernet connector integrated in PSE 201. Other known methods of coupling network cable 205 to PSE 201 may also be used. In one embodiment, network cable 205 is further coupled to a powered PSE (not shown).

Generally, before power is supplied to PSE 201 via network cable 205, it is determined whether PSE 201 is a valid powered device through a powered device detection process. For detection, a probing input may be received by PSE 201 via network cable 205. Current may flow through the circuit of PSE 201. In particular, current flows through PSE-IC 250 and miscellaneous circuitry 245, which both impart an equivalent resistance to the output. False detection mitigation circuitry 240 is arranged between the positive voltage supply terminal and negative voltage supply terminal and in parallel with PSE-IC 250 and/or miscellaneous circuitry 245.

Current also flows through mitigation circuitry 240, which also imparts an equivalent resistance to the output. The placement of mitigation circuitry 240 in parallel with PSE-IC 250 and/or miscellaneous circuitry 245 provides a total equivalent resistance that is less than the individual resistances of the circuits (i.e., PSE-IC 250, miscellaneous circuitry 245, and mitigation circuitry 240), which in turn provides an increase in the resulting current flow during detection. The increase in current flow is substantial enough to place a resistive signature of PSE 201 outside the range of a valid powered device.

The resistive signature of PSE 201 may be used to avoid false detection of a powered device, even if PSE 201 includes multiple ports that take leakage current from each other. As long as the number of ports is less than a maximum port threshold, false detection may be avoided. It should be recognized that the maximum port threshold may vary based on particular circuitry implementations and leakage current generated therefrom. As previously described, each additional port in a multi-port implementation reduces leakage current through an unpowered PSE by 1/N. As used herein, the maximum port threshold is the maximum number of ports that may be implemented on a PSE such that the current is not reduced to a value that falls within the resistive range of a powered device.

Isense pin 225 may detect the return current after passing through resistor 230 and may provide an additional leakage path through PSE-IC 250. The return current continues to travel through the circuit and is provided to network cable 205. Upon determining that PSE 201 is a non-compatible device, power is not supplied to PSE 201 through network cable 205.

Figure 2B:
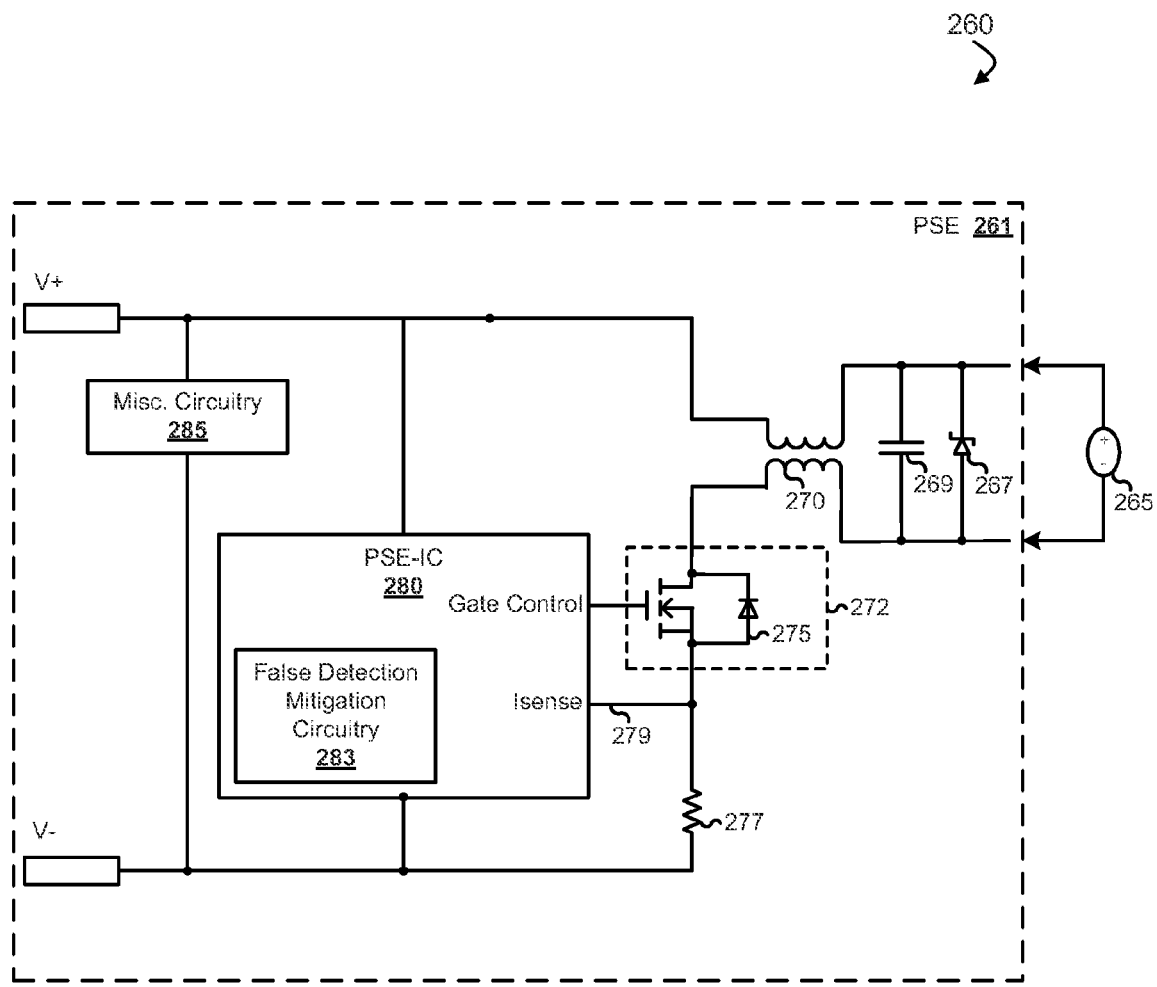
FIG. 2B is a circuit diagram of a power sourcing equipment including false detection mitigation circuitry in an integrated circuit in accordance with an embodiment of the invention.

FIG. 2B is a circuit diagram 260 of a power sourcing equipment including false detection mitigation circuitry in an integrated circuit in accordance with an embodiment of the invention. PSE 261 includes a power supply circuit (not shown), which includes a pin that connects to a power rail for generating a positive voltage supply (V+) terminal and a negative voltage supply (V−) terminal. PSE 261 further includes a protection diode 267, a capacitor 269, a common mode choke 270, an Isense pin 279, a Field Effect Transistor (FET) 272 with body diode 275, a resistor 277, miscellaneous circuitry 285, a power source equipment controller integrated circuit (PSE-IC) 280, and a false detection mitigation circuitry 283 integrated into the PSE-IC 280. In one embodiment, PSE 261 is in a powered-off state. Circuit diagram 260 also includes a network cable 265 which is configured to apply a probing input to PSE 261.

As previously described, it is determined whether PSE 261 is a valid powered device through a powered device detection process. For detection, a probing input may be received by PSE 261. Current may flow through the circuit of PSE 261. In particular, current flows through PSE-IC 280 and miscellaneous circuitry 285, which both impart an equivalent resistance to the output. False detection mitigation circuitry 283 is integrated within PSE-IC 280. PSE-IC 280 is arranged between the positive voltage supply terminal and negative voltage supply terminal and/or in parallel with miscellaneous circuitry 285.

Figure 3A:
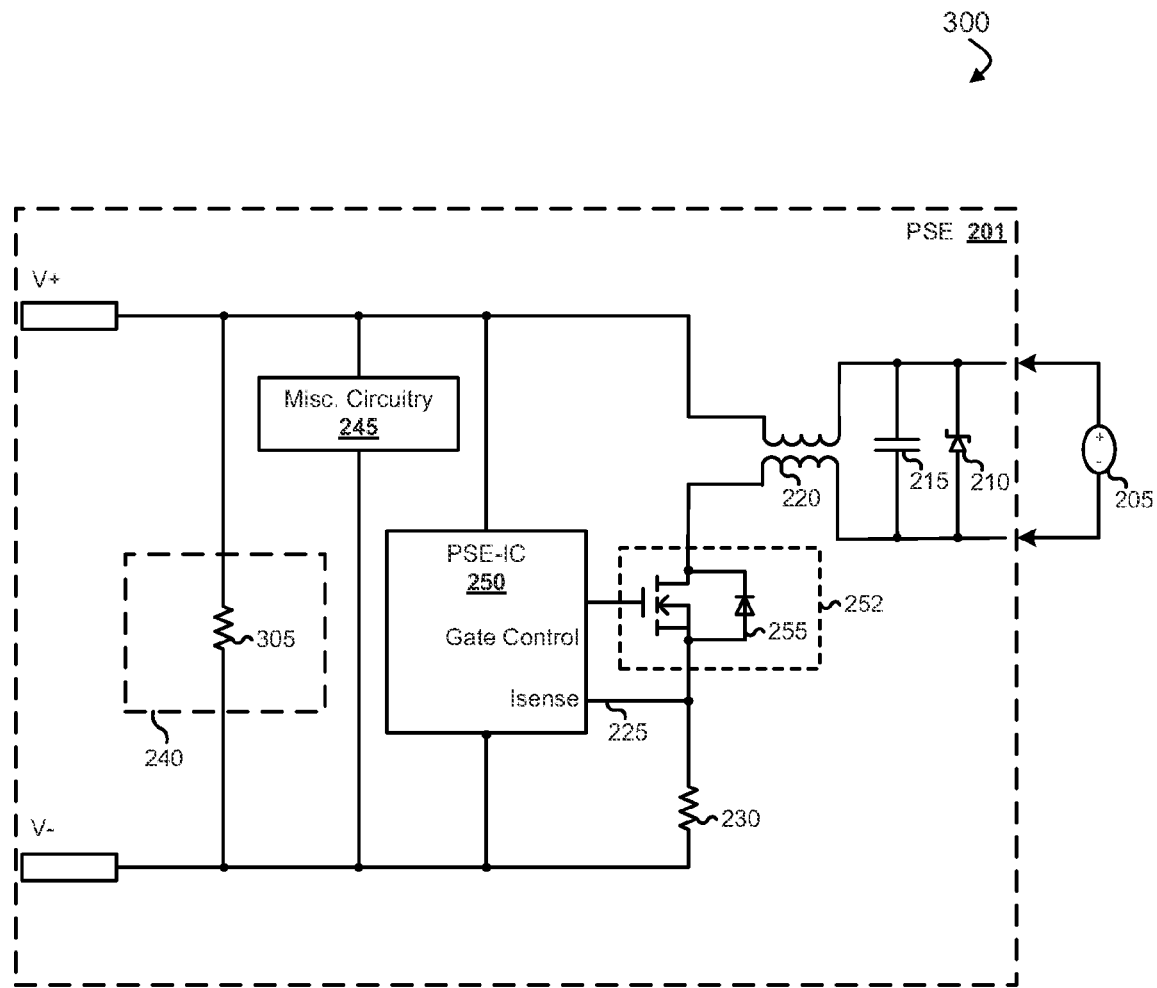
FIG. 3A is another circuit diagram of a power sourcing equipment including false detection mitigation circuitry in accordance with an embodiment of the invention.

FIG. 3A is another circuit diagram of a power sourcing equipment (PSE) 201 including false detection mitigation circuitry in accordance with an embodiment of the invention. Mitigation circuitry 240 may be implemented as a single resistor 305. In one embodiment, resistor 305 may measure 10 K-ohms. If a probing input measures 10 volts and is applied across the PSE 201 circuitry and through resistor 305, an additional 1000 µA of current may result, which is greater than the current range of 80 µA-400 µA for a valid powered device. As such, false detection may be avoided.

When PSE 201 is in a powered-off state and a probing input is received, resistor 305 may successfully increase the current flow and push the resistive signature outside of the range for a valid powered device. When PSE 201 is in a powered-on state, resistor 305 may draw power which increases the energy lost during normal operation. For example in a 54 volt PSE circuitry, resistor 305 having a 10K value may consume 54 volts times 5.4 mA, which is approximately 300 milliwatts (mW) of power. As such, resistor 305 draws power without contributing to the functionality of PSE 201 when powered-on.

Tuning may be performed to minimize the power loss during normal operation. In one embodiment, the value of resistor 305 may be changed to optimize the amount of loss. The PSE circuitry may be tested and the leakage current through the circuitry may be determined. A value of resistor 305 may be determined which causes the resistive signature to be outside of the valid powered device range during a power-on state and which minimizes power consumption during a power-off state.

For example, the circuitry of PSE 201 leaks 700 µA without the addition of mitigation circuitry 240. A 10 K value for resistor 305 may be not optimal. Instead, a 20 K value for resistor 305 would serve the purpose of increasing current flow while minimizing power loss. The 20 K value for resistor 305 leaks 500 µA for a 10 volt probing input making the total leakage current about 1300 µA. Depending on the number of ports in the PSE, this total increase in current may be sufficient to avoid false detection.

Figure 3B:
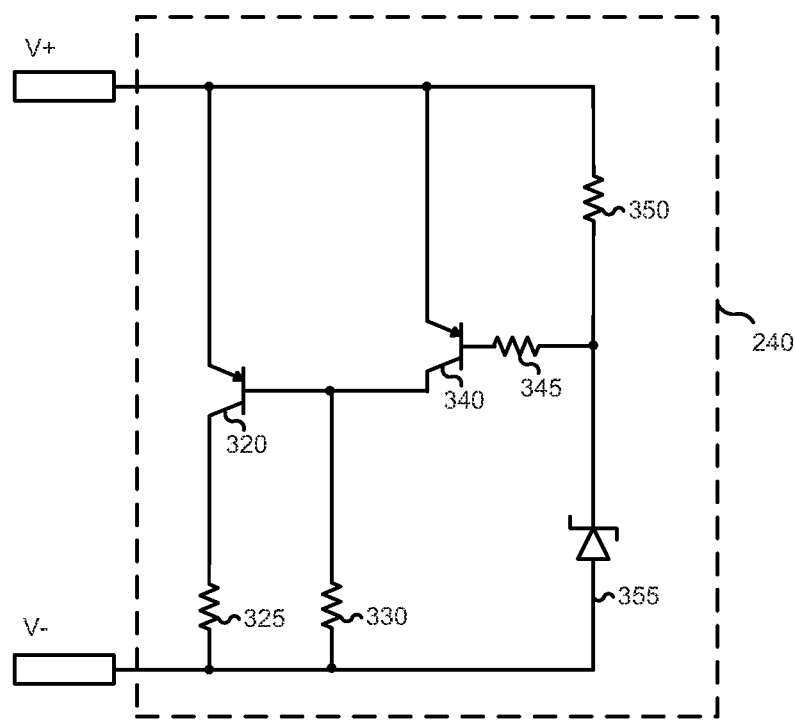
FIG. 3B is a circuit diagram of a false detection mitigation circuitry in accordance with an embodiment of the invention.

FIG. 3B is a circuit diagram of a false detection mitigation circuitry 240 in accordance with an embodiment of the invention. Mitigation circuitry 240 may be implemented as a circuit including bi-polar transistor 320, resistor 325 having a resistance of 237 ohms, resistor 330 having a resistance of 36.1 K-ohms, bi-polar transistor 340, resistor 345 having a resistance of 50 K-ohms, resistor 350 having a resistance of 50 K-ohms, and 10 volt zener diode 355.

Mitigation circuitry 240 draws significant but safe currents when probing inputs exist on an unpowered PSE, and draws very low current when the PSE is in a powered-on state. Mitigation circuitry 240 acts as a voltage-dependent load with non-linear behavior.

Mitigation circuitry 240 applies a 237 ohm resistive load via resistor 325 to the power supply rails, creating a significant leakage current (~40,000 µA) when the probing input applied is below 11 volts. As previously described, the typical range for probing input is 2 volts to 10 volts and expected current in the range of 80 µA to 400 µA. As such, false detection of a powered device may be avoided regardless of how many ports of a practically constructed uPSE are probed simultaneously.

When the unpowered PSE is powered from its internal power supply and the voltage exceeds 11 volts, zener diode 355 turns on which causes bi-polar transistor 340 to turn on. When turned on, bi-polar transistor 340 leaks very low current (i.e., approximately 1 mA for a 54 volt internal supply for the PSE power-on state), and thereby disables bi-polar transistor 320. When bi-polar transistor 320 is off, current is blocked through resistor 325, and as such, resistor 325 does not draw power when the PSE is in the power-on state. The total leakage of mitigation circuitry 240 as implemented in FIG. 3B during normal power supply operation (i.e., PSE power-on state) is approximately 150 mW of power loss. False detection of powered devices is mitigated while operational energy loss is reduced.

Figure 3C:
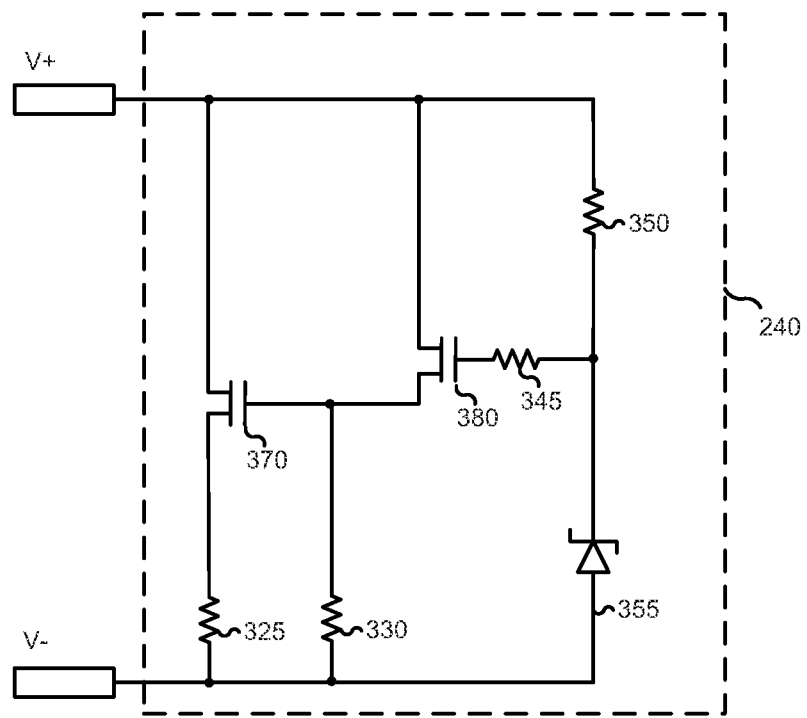
FIG. 3C is another circuit diagram of a false detection mitigation circuitry in accordance with an embodiment of the invention.

FIG. 3C is another circuit diagram of a false detection mitigation circuitry 240 in accordance with an embodiment of the invention. As shown, mitigation circuitry 240 may be implemented as a circuit including field-effect transistor (FET) 370, resistor 325 having a resistance of 237 ohms, resistor 330 having a resistance of 36.1 K-ohms, FET 380, resistor 345 having a resistance of 250 K-ohms, resistor 350 having a resistance of 250 K-ohms, and 10 volt zener diode 355.

In one embodiment, the mitigation circuitry of FIG. 3C is similar to that of FIG. 3B. To increase efficiency, FETs may be used instead of bi-polar transistors. FETs produce lower leakage when the PSE is in a powered-on state when compared with bi-polar transistors.

Figure 4:
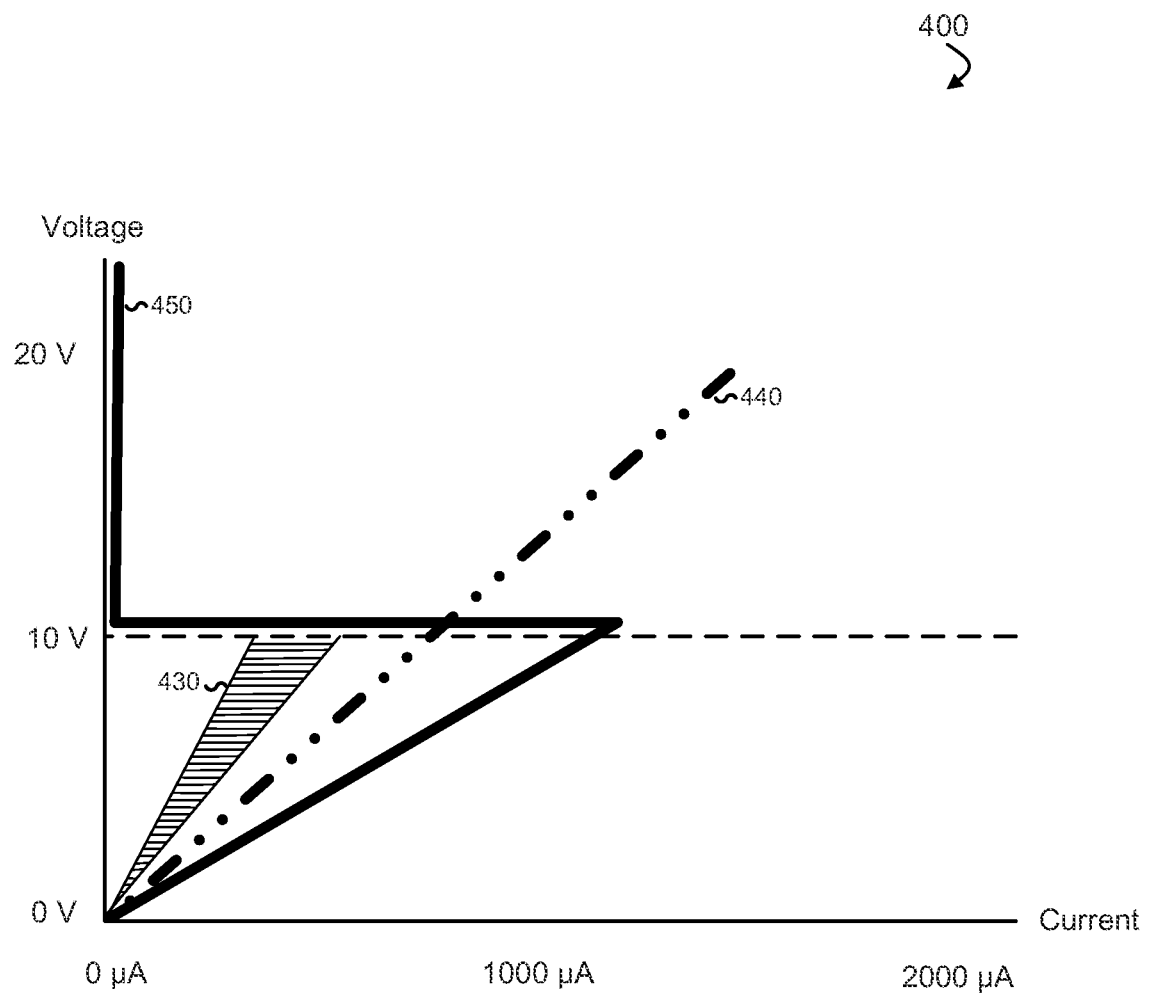
FIG. 4 is a voltage versus current graph comparing various embodiments of the invention.

FIG. 4 is a voltage versus current graph 400 comparing various embodiments of the invention. Area 430 illustrates a range of current (e.g., 80 µA to 400 µA) drawn which corresponds with a resistive range (e.g., 19 K-ohms to 26.5 K-ohms) of a valid powered device.

Line 440 corresponds to an embodiment of the current invention that adds a resistor arranged between the positive voltage supply terminal and the negative voltage supply terminal, and in parallel with a PSE-IC and/or miscellaneous circuitry of a PSE. For example, line 440 corresponds with the embodiment described in FIG. 3A. The addition of the resistor, such as resistor 305, in the unpowered PSE circuitry causes the current to increase as a probing input is applied. As previously described, the probing input may range from 2 volts to 10 volts. As such, a return current and corresponding resistance is outside the resistive range of area 430.

When the PSE is in a powered-on state, the internal power supply of the PSE may apply a voltage greater than 10 volts. As shown, the embodiment corresponding to line 440 continues to draw current in normal operation (e.g., greater than 10 volts).

Line 450 corresponds to an embodiment of the current invention that adds a false detection mitigation circuitry arranged between the positive voltage supply terminal and the negative voltage supply terminal, and in parallel with a PSE-IC and/or miscellaneous circuitry of a PSE. For example, line 450 corresponds with the embodiment described in FIG. 3B or 3C. As shown, the addition of the mitigation circuitry increases the current significantly as the probing input is applied. This significant increase in current places the corresponding resistance well beyond the range of current depicted by area 430. As such, the probability of false detection is greatly reduced, even considering a multi-port implementation of the PSE.

Moreover, when the PSE is in a powered-on state (e.g., greater than 10 volts applied by internal power supply of PSE), the amount of current drawn by the embodiment corresponding to line 450 drops to near zero µA, thus limiting power loss. The particular amount of current drawn when the PSE is in a powered-on state depends on the voltage applied, and is well below the range depicted by area 430. For example, if 50 volts is applied during the powered-on state, the leakage drops to approximately 200 µA for a power loss of approximately 10 mW. Thus the current consumption by the PSE in a powered-on state is less than the current consumption by the PSE when a detection probe is present.

Figure 5:
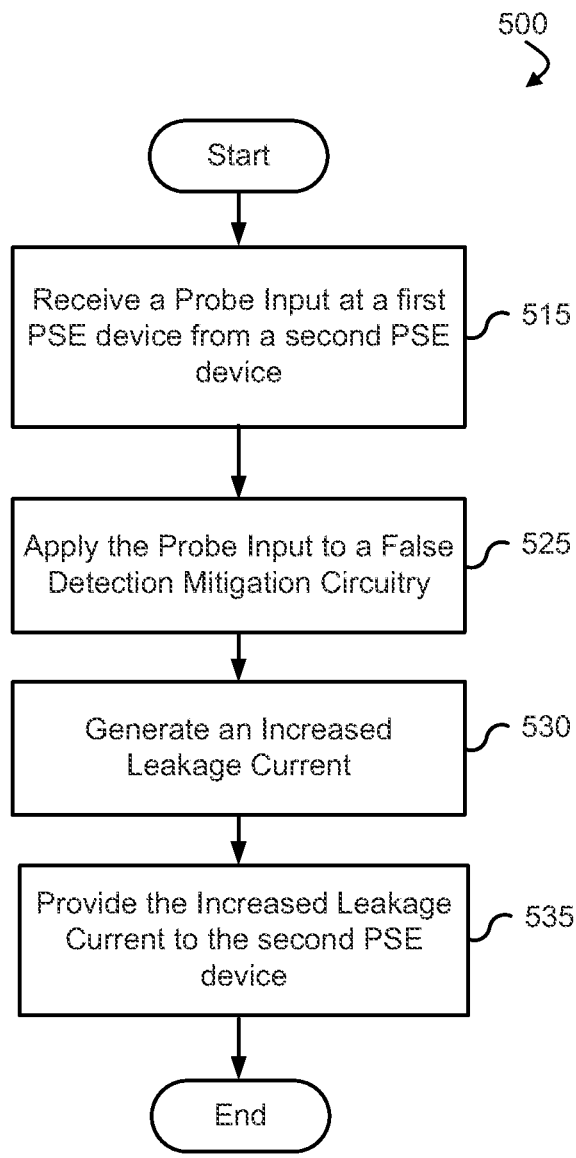
FIG. 5 is a process flow diagram for mitigating false Power over Ethernet detection events in accordance with an embodiment of the invention.

FIG. 5 is a process flow diagram for mitigating false Power over Ethernet detection events in accordance with an embodiment of the invention. The depicted process flow 500 may be carried out by execution of one or more sequences of executable instructions. In another embodiment, process flow 500 is carried out by components of a PSE device, an arrangement of hardware logic, e.g., an Application-Specific Integrated Circuit (ASIC), etc.

Mitigation of false PoE detection events may be performed by a PSE. At step 515, a probe input may be received at a first PSE device from a second PSE device. In one embodiment, the first PSE device and the second PSE device are coupled to each other via a network cable.

At step 525, the probe input is applied to a false detection mitigation circuitry of the first PSE device. In one embodiment, the probing input may be a voltage in a range of 2 volts to 10 volts. At step 530, an increased leakage current is generated. The increased leakage current may cause the resistive signature of the first PSE to fall outside of the resistive range of a valid powered device.

The increased leakage current may be provided to the second PSE device, for example, through the network cable, at step 535. The second PSE device may then determine the resistive signature of the first PSE device based on the increased leakage current and may compare the resistive signature to the resistive range of a valid powered device. It may be determined that the first PSE device is not a valid powered device by detecting that the resistive signature does not meet the resistive range of a powered device. The second PSE device may supply data and power to the first PSE device where the resistive signature is within the resistive range as a result of the comparison. Otherwise, the second PSE device may supply data only (i.e., not power) to the PSE device where the resistive signature is outside of the resistive range as a result of the comparison.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program. Still further, embodiments of the present invention may be conveyed electronically via any medium such as a communication signal carried over a wired or wireless connection and embodiments suitably encompass the same.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A power sourcing equipment (PSE) device for use in a powered network, comprising:
    a PSE controller integrated circuit;
    a power rail;
    a plurality of network ports configured to communicate data, selectively provide power to one or more devices through a plurality of network cables, and to receive a probing input through a network cable of the plurality of network cables, the plurality of network ports coupled to the power rail;
    a power supply circuit coupled to the power rail; and
    a false detection mitigation circuit coupled to the power rail, the false detection mitigation circuit configured to increase a leakage current of the PSE device, wherein the increased leakage current is associated with a resistive signature that is outside of a resistive range of a valid powered device.

2. The PSE device of claim 1, wherein the false detection mitigation circuit is coupled to a positive voltage supply terminal of the power supply circuitry and a negative voltage supply terminal of the power supply circuit in parallel with the PSE integrated circuit.

3. The PSE device of claim 1, wherein the false detection mitigation circuit is integrated within the PSE controller integrated circuit.

4. The PSE device of claim 1, wherein the false detection mitigation circuit comprises:
   a positive voltage supply terminal;
   a negative voltage supply terminal; and
   a resistor coupled to the positive voltage supply terminal and the negative power supply terminal.

5. The PSE device of claim 1, wherein the false detection mitigation circuit comprises:
   a positive voltage supply terminal;
   a negative voltage supply terminal;
   a first transistor coupled to the positive voltage supply terminal;
   a first resistor coupled to the first transistor; a second resistor coupled to the first transistor;
   a second transistor coupled to the first transistor and the positive voltage supply terminal;
   a third resistor coupled to the second transistor;
   a fourth resistor coupled to the positive voltage supply terminal; and
   a zener diode coupled to the fourth resistor.

6. The PSE device of claim 1, wherein current consumption by the PSE device in a powered-on state is less than current consumption by the PSE device when a detection probe is present.

7. The PSE device of claim 1, wherein said PSE controller integrated circuit comprises a current sense pin connected through a resistor to said false detection mitigation circuit.

8. The PSE device of claim 7, wherein the current sense pin provides a leakage current path through the PSE controller integrated circuit.

9. A system for power distribution to network devices in a powered network, the system comprising:
   a first power sourcing equipment (PSE) device configured to communicate data and selectively provide power to one or more devices; and
   a second PSE device coupled to the first PSE device through a network cable configured to communicate data, selectively provide power to one or more devices, and to receive a probing input through the network cable, wherein the second PSE device includes a false detection mitigation circuit configured to increase a leakage current of the second PSE device, wherein the increased leakage current is associated with a resistive signature that is outside of a resistive range of a valid powered device.

10. The system of claim 9, wherein the false detection mitigation circuit is coupled to a positive voltage supply terminal of the second PSE device and a negative voltage supply terminal of the second PSE device in parallel with a PSE controller integrated circuit of the second PSE device.

11. The system of claim 9, wherein the false detection mitigation circuit comprises:
    a positive voltage supply terminal;
    a negative voltage supply terminal; and
    a resistor coupled to the positive voltage supply terminal and the negative power supply terminal.

12. The system of claim 9, wherein the false detection mitigation circuit comprises:
    a positive power supply terminal;
    a negative power supply terminal;
    a first transistor coupled to the positive power supply terminal;
    a first resistor coupled to the first transistor;
    a second resistor coupled to the first transistor;
    a second transistor coupled to the first transistor and the positive power supply terminal;
    a third resistor coupled to the second transistor;
    a fourth resistor coupled to the positive power supply terminal; and
    a zener diode coupled to the fourth resistor.

13. The system of claim 9, wherein the first PSE device is further configured to compare the resistive signature to the resistive range of a valid powered device.

14. A method for mitigating false powered device detection in a powered network, the powered network including a power sourcing equipment (PSE) device, the method comprising:
    receiving a probing input through a network cable coupled to a network port of the PSE device;
    applying the probe input to circuitry of the PSE; and
    generating an increased leakage current of the PSE device in response to the probing input, wherein the increased leakage current is associated with a resistive signature that is outside of a resistive range of a valid powered device.

15. The method of claim 14, further comprising: comparing the resistive signature to a resistive range of a valid powered device.

16. The method of claim 15, further comprising:
    supplying data and power to the PSE device where the resistive signature is within the resistive range as a result of the comparison; and
    supplying data and not power to the PSE device where the resistive signature is outside of the resistive range as a result of the comparison.

17. The method of claim 14, wherein the increased leakage current is generated while the PSE device is in a powered-off state.

18. The method of claim 14, wherein a leakage current produced by said probing input is increased to generate said increased leakage current by false detection mitigation circuitry in said PSE device.

19. The method of claim 18, further comprising tuning said false detection mitigation circuitry to minimize power loss during normal operation while still increasing said leakage current to that associated with said resistive signature when said PSE device is in a powered-off state.

20. The method of claim 19, wherein said tuning comprise changing a value of a resistor of said false detection mitigation circuitry.

* * * * *

UNITED STATES PATENT AND TRADEMARK OFFICE
CERTIFICATE OF CORRECTION

| | | |
|---|---|---|
| PATENT NO. | : 9,037,876 B2 | Page 1 of 1 |
| APPLICATION NO. | : 13/260175 | |
| DATED | : May 19, 2015 | |
| INVENTOR(S) | : Daniel Joseph Dove | |

It is certified that error appears in the above-identified patent and that said Letters Patent is hereby corrected as shown below:

On the title page item 74, Attorney, in column 2, line 1, delete "HP Patent Development" and insert -- HP Patent Department --, therefor.

Signed and Sealed this
Sixth Day of October, 2015

Michelle K. Lee
*Director of the United States Patent and Trademark Office*